United States Patent [19]

O'Gwynn et al.

[11] Patent Number: 4,561,608
[45] Date of Patent: Dec. 31, 1985

[54] ADAPTIVE END OF TAPE DETECTION APPARATUS AND METHOD

[75] Inventors: David C. O'Gwynn, Colorado Springs, Colo.; Thomas L. Helmers, Millbrae, Calif.

[73] Assignee: Ampex Corporation, Redwood City, Calif.

[21] Appl. No.: 653,752

[22] Filed: Sep. 20, 1984

[51] Int. Cl.⁴ .................. B65H 59/38; G03B 1/04; G11B 15/32
[52] U.S. Cl. .................................. 242/186; 360/74.1
[58] Field of Search ............. 242/186, 187, 189, 190, 242/191; 200/61.15, 61.16; 318/6, 7; 360/71, 74.1-74.4; 364/561, 562

[56] References Cited

U.S. PATENT DOCUMENTS 3,982,160  9/1976  Goldschmidt ........................ 318/7
4,213,583  7/1980  Mitani et al. ....................... 242/186
4,232,371 11/1980  Kamoto .............................. 364/561

Primary Examiner—Leonard D. Christian
Attorney, Agent, or Firm—Elizabeth E. Strnad; Joel D. Talcott

[57] ABSTRACT

The changing diameters of the respective tape packs wound on the supply and take-up reel are continually measured. The measured diameters of each reel are compared to a stored minimum diameter value corresponding to an end of tape on that particular reel. When the apparatus is in a learning mode, the stored minimum diameter values for each reel are updated every time when a new measured value is smaller than the previously stored value. The last stored value is utilized for comparison in an end of tape detection mode, to allow stopping the tape transport mechanism before the end of tape would run off that reel to prevent damaging the transducers or the tape.

34 Claims, 12 Drawing Figures

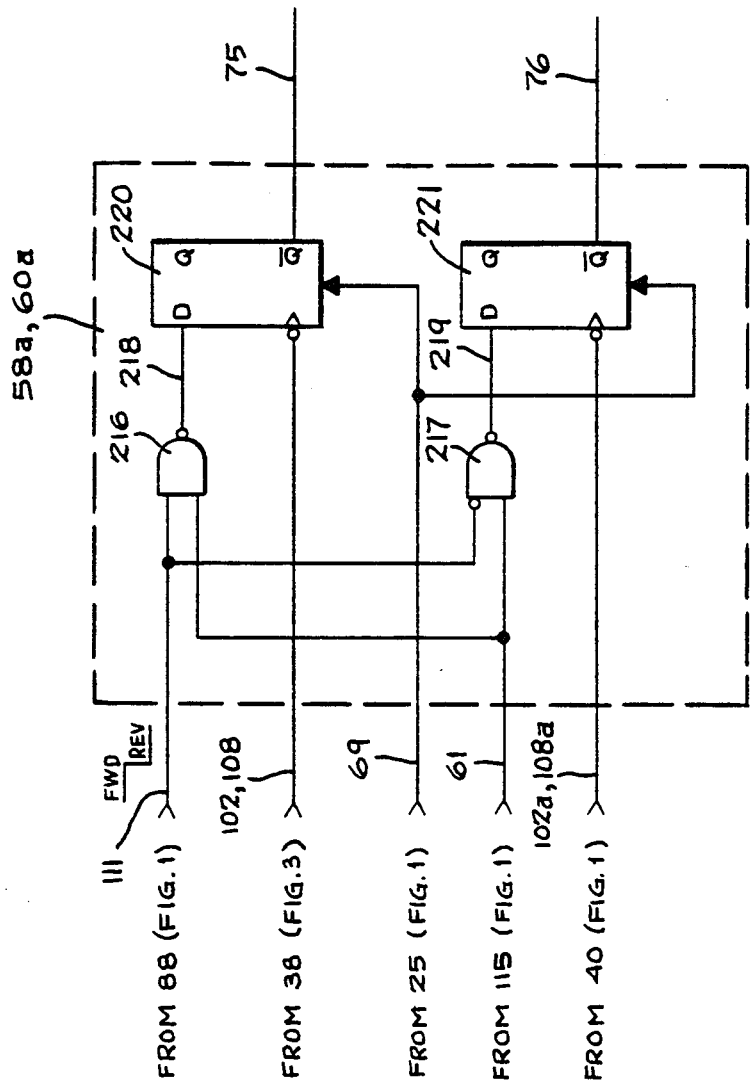

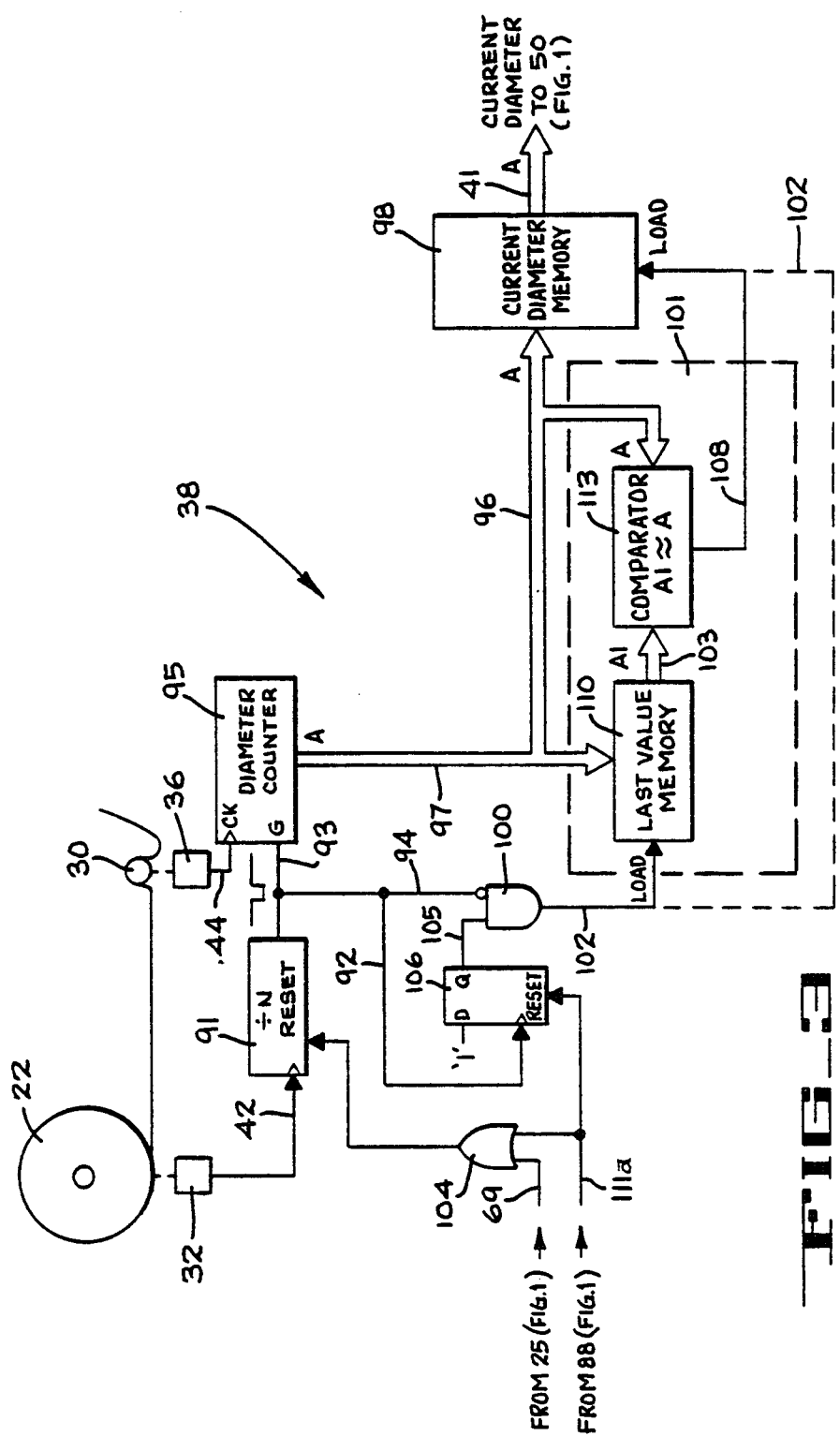

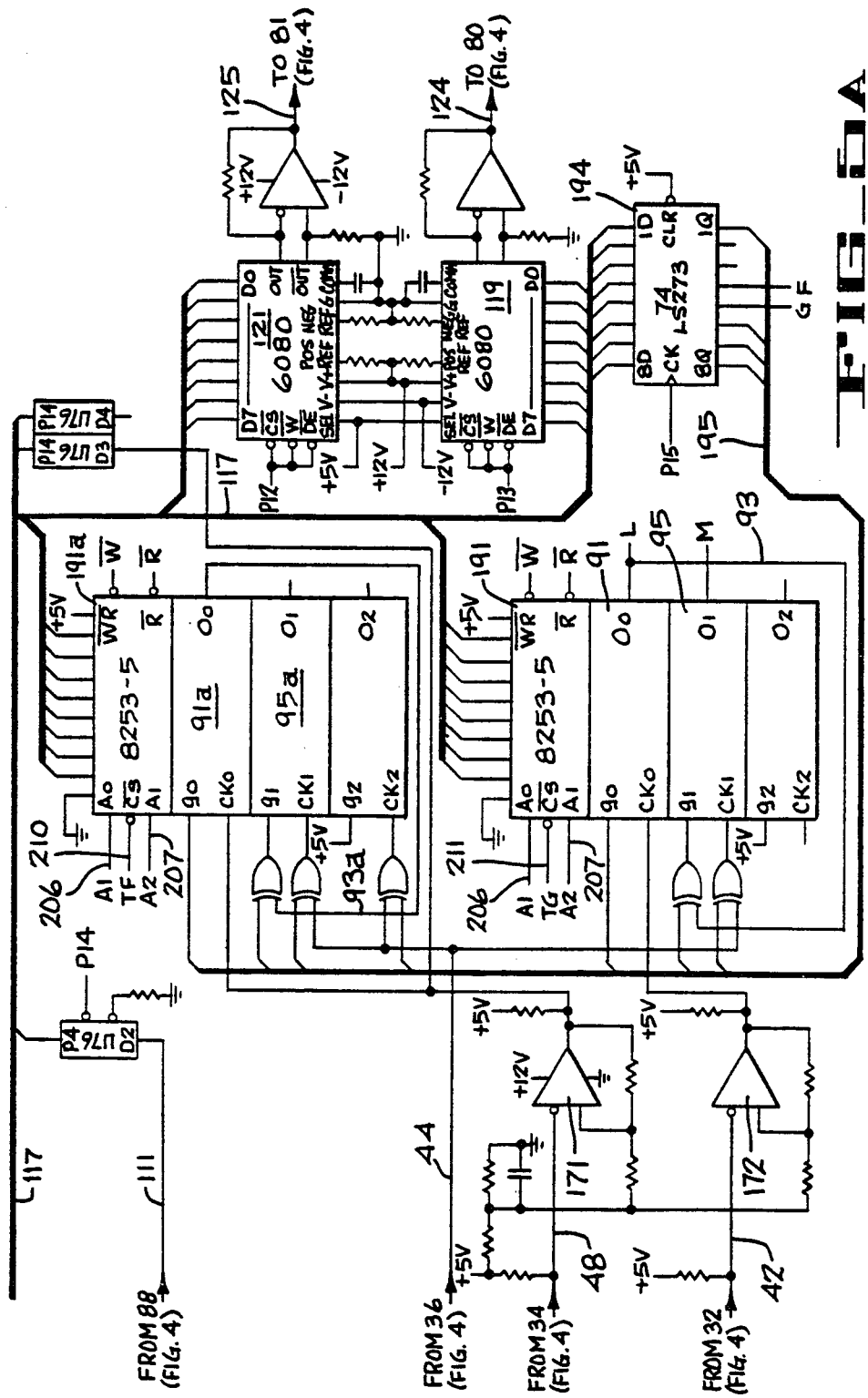

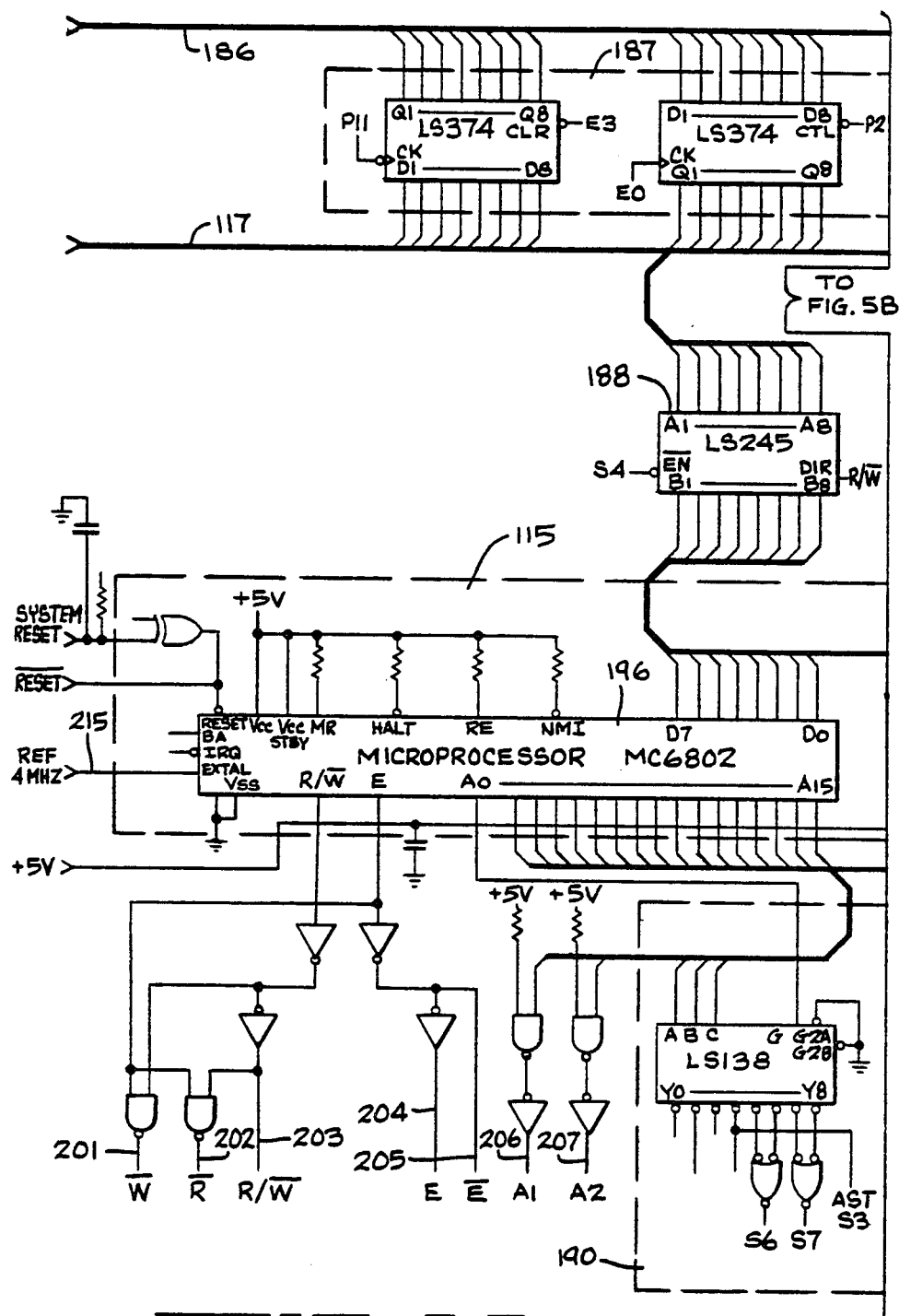
FIG_5B

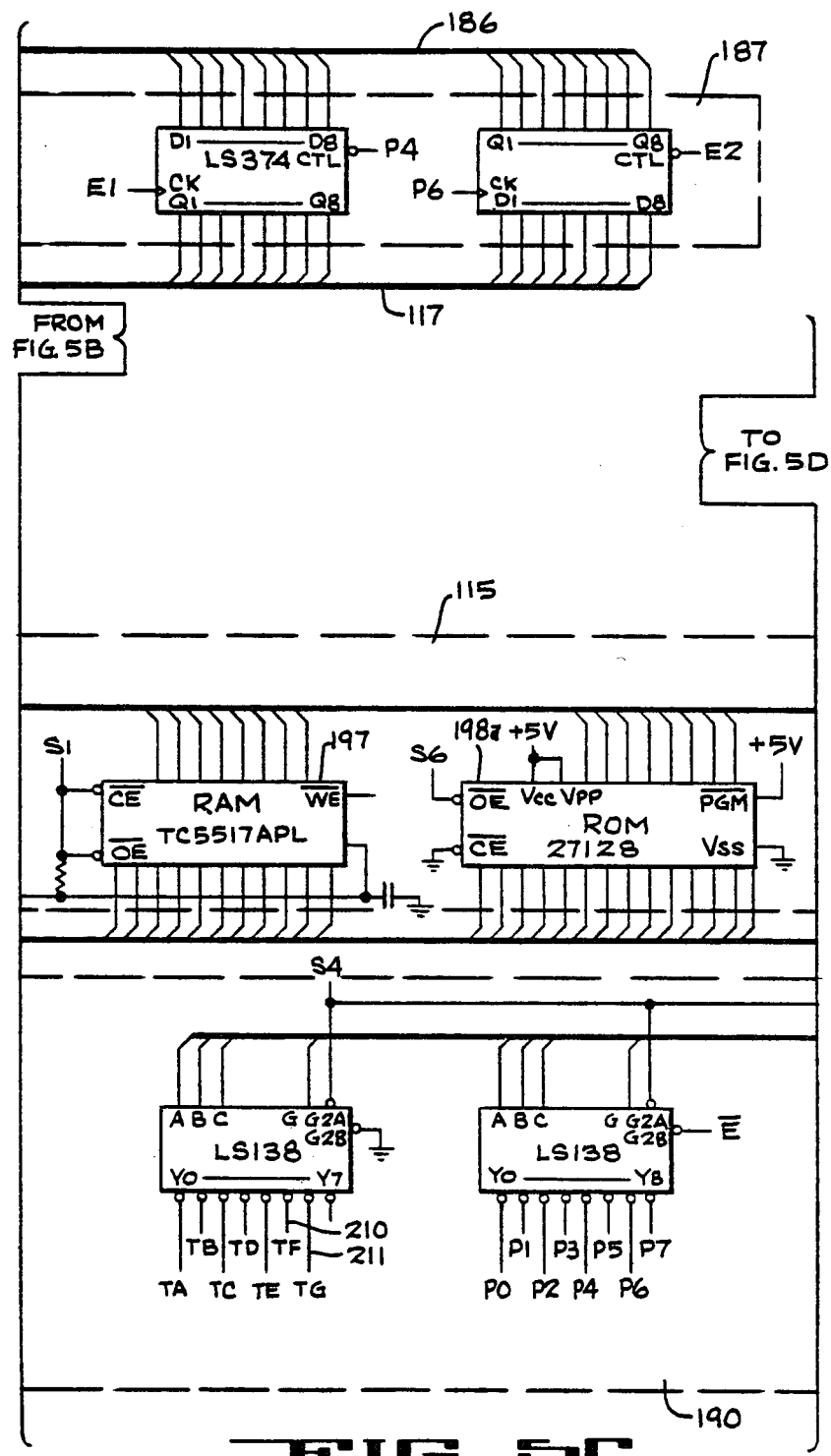

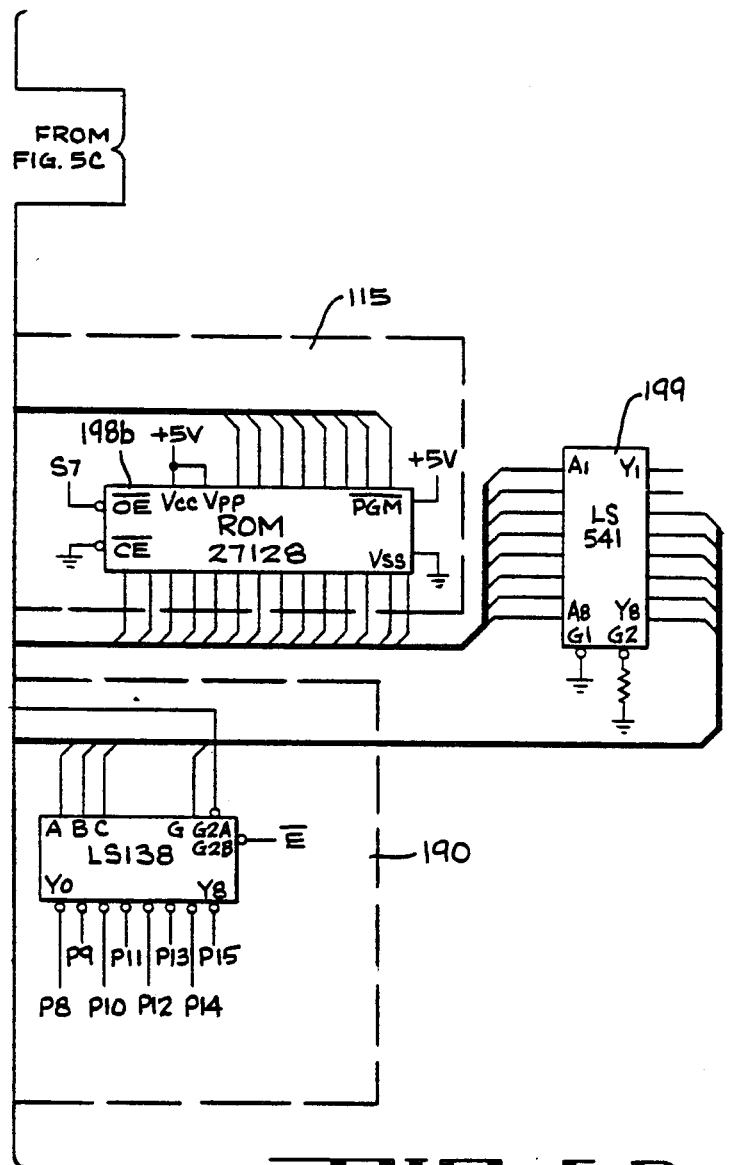
FIG_5D

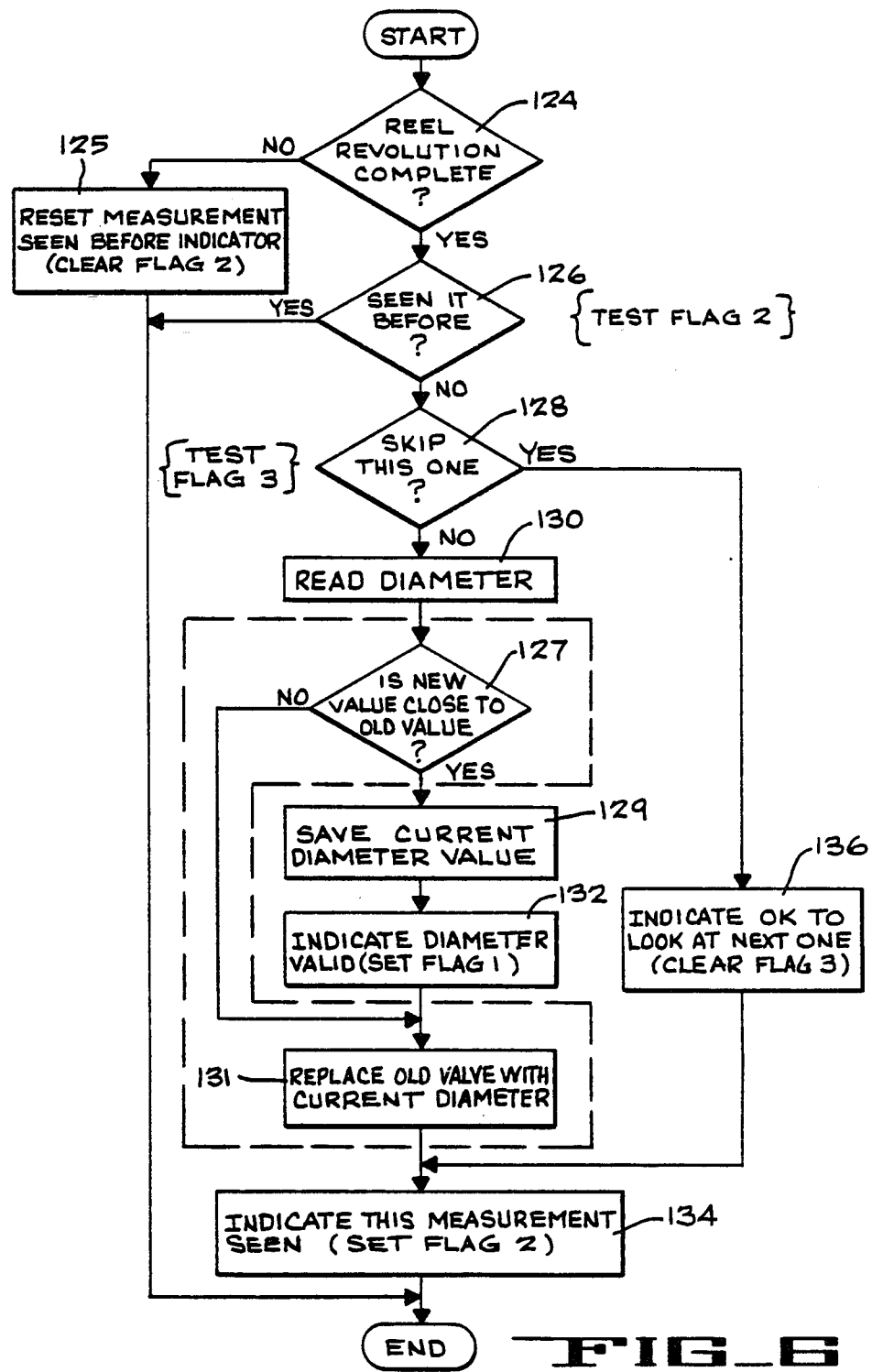
FIG_6

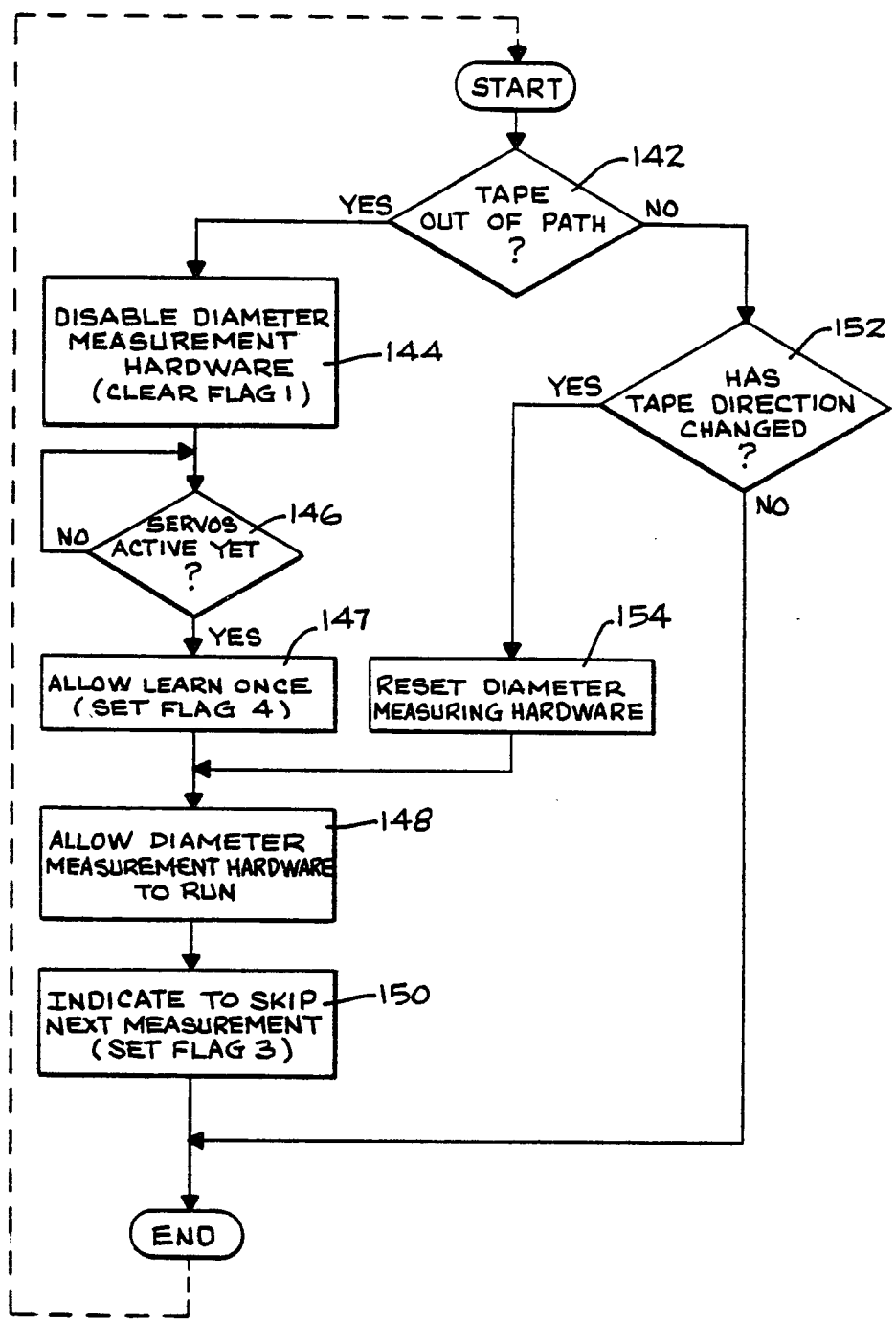
FIG_7

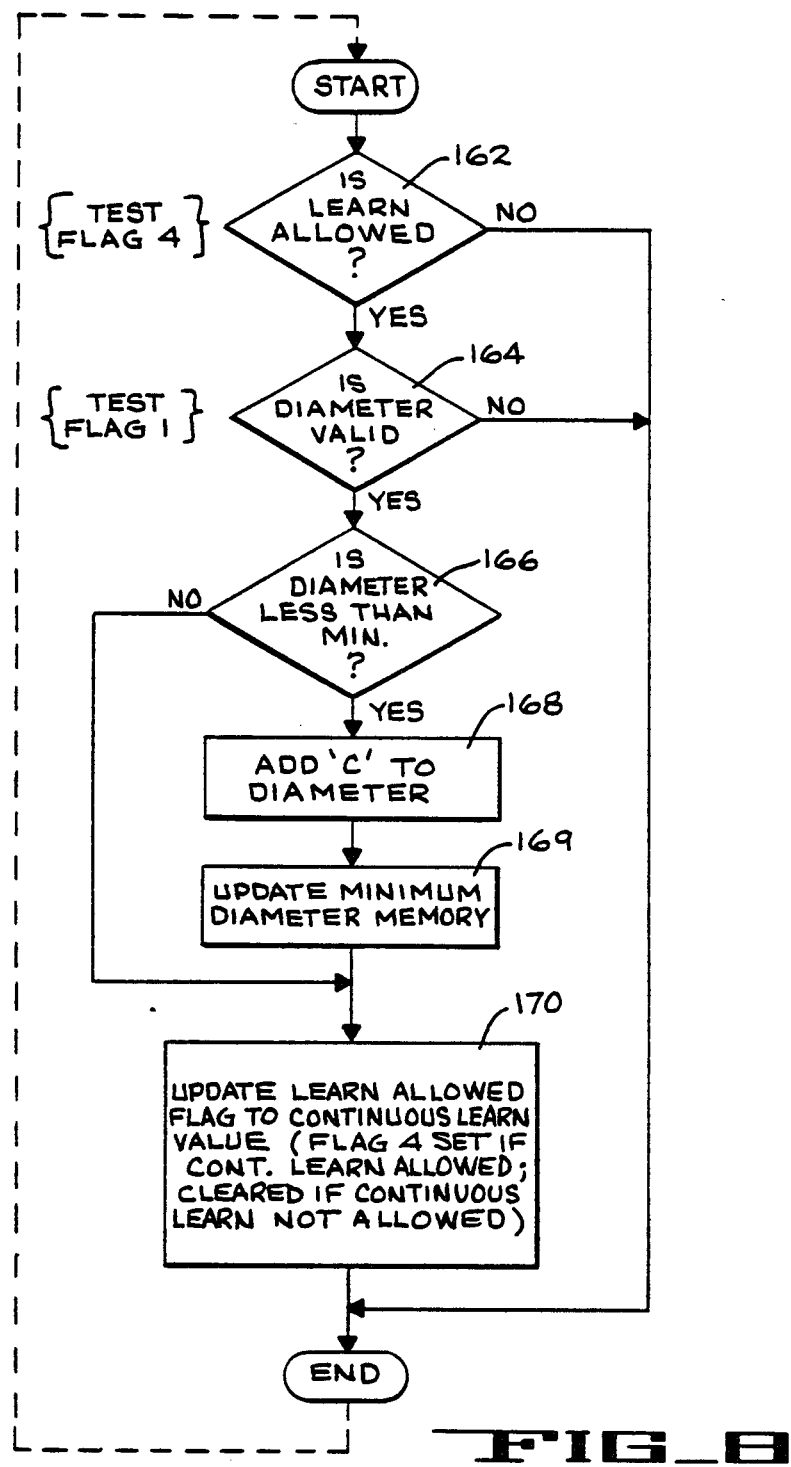
FIG_8

ADAPTIVE END OF TAPE DETECTION APPARATUS AND METHOD

The invention relates to end of tape detection and, more particularly, to an apparatus and method for detecting end of tape on reels utilized in tape recording or reproducing devices.

In tape recording or reproducing devices it is generally known to transport an information signal carrying tape between two reels on which the two opposite ends of the tape are secured. The tape is transferred by transport means from one of the reels, generally referred to as a supply reel, to the other reel, generally referred to as a takeup reel. When the tape moves longitudinally in a forward direction, the effective diameter of the tape pack wound on the supply reel is decreasing while the effective diameter of the tape pack on the takeup reel is increasing.

When the tape is transported as indicated above in a magnetic recording or reproducing device, it passes in close proximity of one or more electromagnetic transducers which may record an information signal thereon or reproduce a previously recorded information signal therefrom, respectively. During the recording or reproducing operation the longitudinal tape speed is accurately controlled, usually by a capstan drive which drives the tape at a selected speed past the transducers. The rotation of the capstan is accurately controlled by a capstan drive servo circuit as it is well known in the art of magnetic tape recording and reproduction.

During the above-mentioned transfer of tape between the two reels it is important to detect continuously the amount of tape on each reel so that it may be determined, for example, how much tape is remaining for recording or reproduction on a reel or in which direction should the tape move in a search mode to locate a certain portion of the recorded information. Therefore, it is well known to measure the instantaneous diameter of a tape pack on each reel, for example by counting the number of linear units of tape for a given number of whole or fractional number of reel revolutions.

As an example, it has been known to measure the instantaneous tape pack diameter as a ratio of capstan or idler tach pulses, shortly tachs, and the supply or takeup reel tachs, respectively. As well known, the smaller the diameter of the tape pack wound on the reel, the faster are the reel revolutions. However, the capstan revolutions remain substantially the same for a selected tape speed, regardless of the changing speed of either the supply or the takeup reel.

It is also important to measure the amount of tape remaining on the reels to permit advanced determination of the end of tape being wound off a reel. If the end of tape is permitted to be wound uncontrollably off a reel, it often leads to damage of the tape or delicate parts of the tape recording/reproducing device located in close proximity to the tape transport path. In some devices, the unwound end of the tape has been known to strike and damage the rotating transducers. Moreover, the uncontrolled end of the tape can lead to the tape impacting and being scratched or otherwise damaged by the tape guide elements along the path of transport.

For example, helical scan recording or reproducing devices employing a single capstan/pinch roller mechanism for controlling the transport of the tape are particularly susceptible to these harmful effects. In such devices, the capstan/pinch roller mechanism is located between one of the tape reels (often the takeup reel) and the rotating head/tape guide drum assembly, commonly, referred to as a scanner. When transporting the tape in the forward direction from the supply reel to the takeup reel under control of the engaged capstan and pinch roller, the tape can be brought to a stop rapidly when its end leaves the supply reel without endangering the tape or delicate elements of the recording/reproducing device. When transporting the tape in the reverse direction from the takeup reel to the supply reel, the transported tape can be brought to a stop without endangering the tape or delicate elements of the transport mechanism, because the engaged capstan and pinch roller holds the loose end of the tape when wound off the takeup reel. However, in other operating modes of the recording/reproducing device when the capstan and pinch roller are out of engagement, such as tape shuttle when tape is rapidly transferred from one reel to the other, there is danger of harm to the delicate elements of the transport mechanism and/or the tape.

In one type of such devices, the scanner rotates in a direction opposite to the direction of travel of the tape around the rotating scanner when the tape is transported in the forward direction from the supply reel to the takeup reel. This establishes a pressure gradient at the location where the tape leaves the scanner in its travel towards the capstan and following takeup reel that creates a force on the tape tending to draw the tape towards the rotating scanner. As long as the tape is wound on both reels, this force is overcome. However, in the reverse tape shuttle mode of operation (capstan and pinch roller disengaged and the tape transported from the takeup reel to the supply reel), this force can draw the end of tape wound off the takeup reel into the rotating scanner. When this occurs, the transducers carried by the rotating scanner and the tape itself are often damaged.

To prevent such damages, it has been known to compare the measured diameter of the decreasing tape pack on the supply reel to a safe minimum value. When the measured diameter reached that minimum diameter value the tape transport has been stopped. As the minimum diameter value, a constant value has been utilized which has been determined from a largest possible reel hub diameter of commercially available reels and minimum amount of tape which has to be wound on the reel to secure the end of tape thereon.

Because the reel hub diameters of commercially available reels for a given reel size vary significantly, generally by as much as forty percent, that safe minimum diameter value did not allow stopping the tape transport at a location corresponding to a desired minimum amount of tape wound on the reel hub. Therefore, in instances where the hub diameter was much smaller than presumed by the safe value, a considerable amount of tape remained on the supply reel when the end of tape has been detected by the prior art circuits. Consequently, the tape could not be shuttled or cued to a material previously recorded on that portion of the tape.

SUMMARY OF THE INVENTION

The present invention overcomes the shortcomings and disadvantages of the prior art by providing an adaptive end of tape detection method and apparatus. In accordance with the invention the respective tape pack diameters on the supply and takeup reel are continually measured and compared to a stored minimum diameter value corresponding to an end of tape on that particular reel. When, for example, a reel of tape is inserted into the device, the end of tape detection circuit compares the measured diameter of the tape pack wound on that reel to a stored safe minimum diameter value. That stored value corresponds to a largest possible minimum diameter value which is necessary to assure that the end of tape will remain on the reel. When the measured diameter value is smaller than the stored value, the stored value is updated by that measured value. It will be further referred to the above-described operation as "learning mode". In accordance with the present invention, the learning mode is selectively enabled when the tape is transported under such conditions that no harm can be done thereto or to any portion of the recording-/reproducing device, if the tape is unwound from a reel. For example, in a recording or reproducing device having a single capstan/pinch roller mechanism briefly described hereinbefore, a learning mode can be enabled during any capstan controlled tape transport operating mode or a forward tape shuttle operating mode. The learning mode would be disabled in the reverse tape shuttle mode. It should be appreciated, however, the particular operating mode of a recording or reproducing device that would endanger the tape or elements of the device as a result of being wound off a reel depends upon the construction of the transport mechanism and operating modes of the device. For example, helical scan recording and reproducing devices can have various relative tape transport and transducer rotation arrangements. In some of these devices, the transducer is rotated in a direction opposite to the forward direction of travel of the tape about the rotating scanner, as previously described. In others, the transducer is rotated in the same direction as the travel of the tape about the rotating scanner. Helical scan recording and reproducing devices also can have tape transport mechanisms utilizing other than capstan/pinch roller mechanisms for controlling the transport of the tape. Vacuum capstans and vacuum columns are examples of such other mechanisms. Moreover, the capstan/pinch roller mechanism can be located at either side of the rotating scanner. Such variations in the transport mechanism can alter the operating mode that endangers the tape and delicate elements of the recording or reproducing device when the end of the tape is wound off a reel. In the preferred embodiment of the invention, the end of tape detection apparatus operates in the learning mode when the tape is transported under capstan control such as during recording or playback. Although the learning mode can be executed in some other operating modes as well, such as, the forward tape shuttle mode when the capstan and pinch roller are disengaged, it is preferred to execute the learning mode only when the tape transport is under capstan control. Thus in the learning mode the stored diameter value for each reel is updated every time when the measured diameter value is smaller than the stored value. When the tape is transported during shuttle or cue operation, when the capstan control is not utilized, the learning mode is disabled. When the measured diameter of a decreasing tape pack reaches the last stored minimum value, during a shuttle or cue operation, the end of tape detection circuit applies a control signal to the tape transport means which in turn causes the transport means to stop. Consequently, the tape transport can be stopped precisely at a desired location for each individual reel while only a minimum amount of tape is left on the supply reel which is necessary to prevent tape run-off. It is a significant advantage of the invention that the foregoing operation is applicable to individual reels which may have significantly different hub diameter sizes.

Additional features and advantages of the invention include resetting the apparatus and restarting the learning operation every time a particular reel is removed from the recorder or the tape is outside the prescribed tape path in the recorder. This assures that the minimum diameter value which has been obtained for a particular reel will not be utilized for a different reel, which may have a different hub diameter. A new minimum value for that new reel will then be obtained through a new learning process.

A further feature which prevents erroneous diameter values from being stored includes comparing two subsequently measured diameter values. The stored value is allowed to be updated only if there are no significant differences between these two values, since abrupt changes between these values would indicate measuring errors.

BRIEF DESCRIPTION OF THE DRAWINGS

FIGS. 2A and 2B are detailed functional block diagrams of a portion of the circuit of FIG. 1.

FIG. 3 is a detailed functional diagram of a diameter measuring portion of the circuit of FIG. 2A.

FIGS. 5A to 5D are consecutive portions of a detailed circuit diagram corresponding to the block diagram of FIG. 4.

FIGS. 6 to 8 are various flow charts illustrating the operation of the embodiment of FIGS. 4 to 5D.

DETAILED DESCRIPTION

Figure 1:
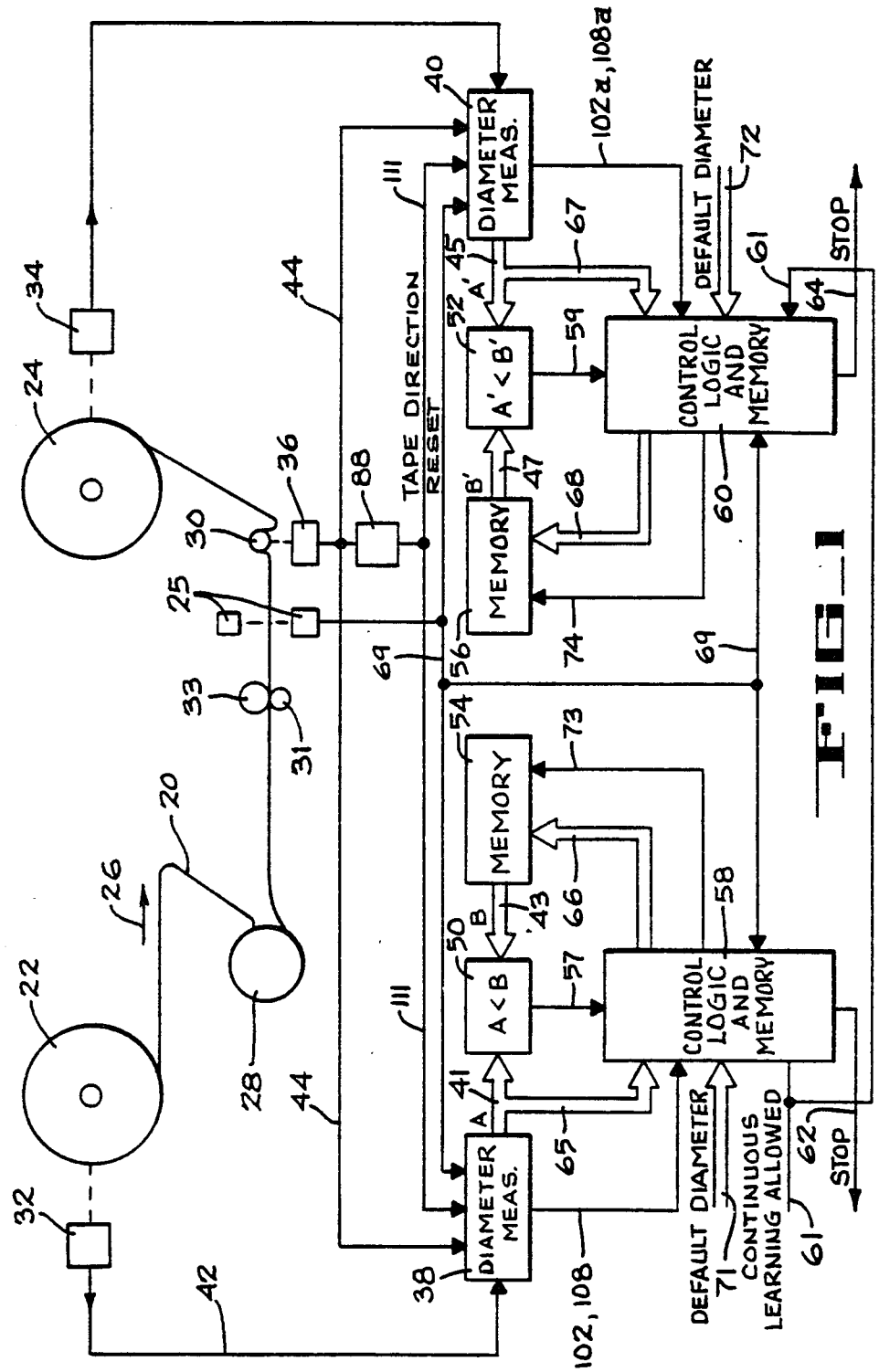
FIG. 1 is a simplified functional block diagram of a preferred embodiment of the invention.

Referring now to FIG. 1, a magnetic tape 20 is shown as being transported between a supply reel 22 and a takeup reel 24 in a forward direction shown by arrow 26. The tape 20 passes around a rotating scanner drum 28 as it is well known from rotary scan recorders, for example helical scan recorders. One or more transducers (not shown) are arranged around the periphery of the scanner drum 28, and engage the tape 20 for recording thereon or reproducing therefrom an information signal, as it is well known in the art.

A tape timer idler 30 is arranged along the tape path in contact with the tape 20. Respective tach pulse detection circuits 32, 34 and 36 for the supply reel 22, the takeup reel 24 and the tape timer idler 30 are utilized to sense the rotation of these respective elements in a manner well known in the art. A capstan 31 and pinch roller 33 are shown as being located along the tape path as well known in the art.

The continually changing diameters of the tape packs on each reel 22, 24 are continuously measured by respective diameter measuring circuits 38, 40 which circuits will be described later in more detail. The circuit 38 receives the supply reel tach pulses via line 42 and the idler tach pulses via line 44 and it provides an output signal A on a data line 41, representing the tape pack diameter on the supply reel 22. Similarly, the takeup reel tape pack diameter measuring circuit 40 receives the tach pulses via line 48 and the idler tach pulses via line 44 and it provides an output signal A' on a data line

45, representing the current tape pack diameter on the takeup reel 24. To simplify the description, it will be further referred to these respective diameters as supply and takeup reel diameter.

A tape detector 25 is utilized to detect absence of tape from the prescribed tape path within the recorder. As the detector 25 for example a well known photo emitter and photo detector can be utilized, preferably type GE 23B1 manufactured by General Electric Corporation. The photo emitter and photo detector 25 are each located on an opposite side of tape 20 as shown in FIG. 1.

It is noted that lead lines conveying control signals are designated by a single line while lines conveying data are designated by double lines throughout the drawing FIGURES.

During the tape movement the currently measured diameter values A, A' are compared in comparators 50, 52 with minimum diameter values B, B' presently stored in memories 54, 56, respectively.

Prior to each end of tape detection operation, for example when a tape reel has been removed from the tape recorder and thereafter it is reinserted therein, when a new tape reel is inserted instead of the removed reel or when the tape has been detected as being outside its prescribed path, a predetermined minimum diameter value for both the supply and takeup reel is stored in the memories 54, 56, respectively. This initially stored value may, for example, correspond to the previously described safe minimum tape pack diameter value utilized by the prior art circuits. This value, further being referred to as "default value", represents the worst case of a minimum tape pack diameter obtained by considering the largest hub diameter size of commercially available reels. In FIG. 1 the default value is stored on lines 71, 72, for each reel 22, 24 for example as a hard-wired binary value, in a well known manner.

For example, prior to a recording or playback operation, when a full reel of tape such as a supply reel 22 is inserted in the recorder, it is threaded through a prescribed tape path, including various tape guides (not shown in FIG. 1), the rotating scanner 28, the capstan 31, tape detector 25, and the idler 30, as well known. The end of tape is attached to a hub of an empty takeup reel 24 by winding a few turns of tape on the hub for example three or more turns, as needed to secure the tape end. Thereafter, a learning mode is initiated automatically by the device by applying for example a high control signal on line 61. For example, the signal on line 61 may be obtained from a well known capstan drive servo circuit, such as shown at 116 in FIG. 4, as it will be described later.

In accordance with an important feature of the invention in the learning mode the end of tape detection circuit is allowed to "learn" at least once whenever a currently measured reel diameter A or A' is smaller than the previously stored minimum diameter B or B'. If A is smaller than B, or A' is smaller than B', a respective comparator 50 or 52 applies a control signal on line 57 or 59 to a control logic and memory circuit 58 or 60, respectively. When the control signal on line 61 indicates that continuous learning is allowed and a newly measured value A or A' is smaller than the previously stored value B or B', then B or B' will be replaced by A or A', in the memory 54 or 56, respectively.

It follows from the foregoing description that when the apparatus of the present invention is in learning mode, the memories 54, 56 are continually updated whenever a smaller than the stored diameter is measured. It is then desired to stop the tape transport when the reel diameter becomes smaller than the last stored diameter to prevent tape running off the reel when the apparatus operates in other than the learning mode.

It will be appreciated that regardless of the direction of tape movement, each time when a smaller than the presently stored diameter value for that particular reel is measured, both memories 54, 56 are continually updated by that smaller value.

It will be understood with respect to the foregoing description that in case of the takeup reel 24 whose tape pack diameter is continuously increasing when the tape 20 is transported in the forward direction 26, preferably only the first valid measurement is considered by the circuit. Analogously, only the first valid measurement of the supply reel tape pack diameter is considered when the tape is moving in reverse direction. The foregoing features allow updating the default diameter value once after the tape has been reinserted into the device while eliminating unnecessary and repetitious diameter comparison operations for increasing diameter values, as it will be described later in more detail.

In the presently described preferred embodiment, utilized in a helical scan tape recorder, the learning mode preferably takes place during recording, playback and variable speed playback. During these operation modes the longitudinal tape movement is controlled by the capstan 31, as well known. Consequently when the end of tape becomes detached from the reel, the tape is being held in position between the capstan 31 and the pinch roller 33. Therefore there is no significant risk involved in damaging the transducers or the tape, as it would occur without the capstan control.

When the tape 20 is running in shuttle or cue operation and the capstan control is disengaged, the relative transducer-to-tape speed is generally in the order of 1500 inches per second in forward and 500 inches per second in reverse direction. During the above indicated operation continuous learning is disabled by applying for example a low signal on line 61, indicating that the capstan drive servo circuit is disabled. When now value A is smaller than the updated value B stored in memory 54, the comparator 50 applies a control signal on line 57 to the control logic and memory circuit 58. In response thereto the circuit 58, applies a stop signal via line 62 to stop the tape transport.

It will be understood with respect to the similarity between the circuit portions of FIG. 1 related to the supply reel and takeup reel, respectively, that the foregoing description is also applicable to the takeup reel circuit portion and therefore will not be repeated herein.

It is seen from the foregoing description that the present invention has the advantage of stopping the tape transport for every individual reel at an optimum position while leaving just enough tape wound on the reel to secure its end on the hub.

It is noted that while in the present description it is generally referred to reel 22 as supply reel and to reel 24 as takeup reel, these denotations do not limit the tape movement to the forward direction shown by arrow 26. Thus when the tape is transported in a reverse direction, that is opposite to arrow 26, learning is also allowed in the preferred embodiment, provided the tape is under capstan control.

With further reference to FIG. 1, when the tape 20 becomes slackened or is removed from the prescribed tape path, for example when changing reels or reinserting a reel, a control signal from tape detector 25 is applied via line 69 to the logic and memory circuits 58, 60. These circuits 58, 60 in turn reset via lines 66, 68 the respective contents of both memories 54, 56 to the previously mentioned default diameter value on lines 71 and 72, respectively. Memory input enable control lines 73, 74 are activated by the respective logic and memory circuits 58, 60 whenever the contents of memories 54, 56 are being updated or reset. The control signal on line 69 also disables the diameter measuring circuits 38, 40, respectively, to prevent obtaining erroneous values therefrom.

The present invention will be further described with reference to a more detailed functional block diagram of the end of tape detection circuit shown in FIG. 2A, and corresponding to FIG. 1.

It is noted that like circuit elements are designated by like reference numerals in all the drawing FIGURES.

It follows from the above description of FIG. 1 that in the preferred embodiment the circuit portions utilized for each reel 22, 24 are substantially identical. Therefore, the diagrams of FIGS. 2A and 3 depict only circuit portions pertaining to one reel, for example the supply reel 22, to simplify the circuit representation as well as the description. However, the diagram of FIG. 2B pertains to both the supply and takeup reel circuit portions, respectively.

Figure 2A:
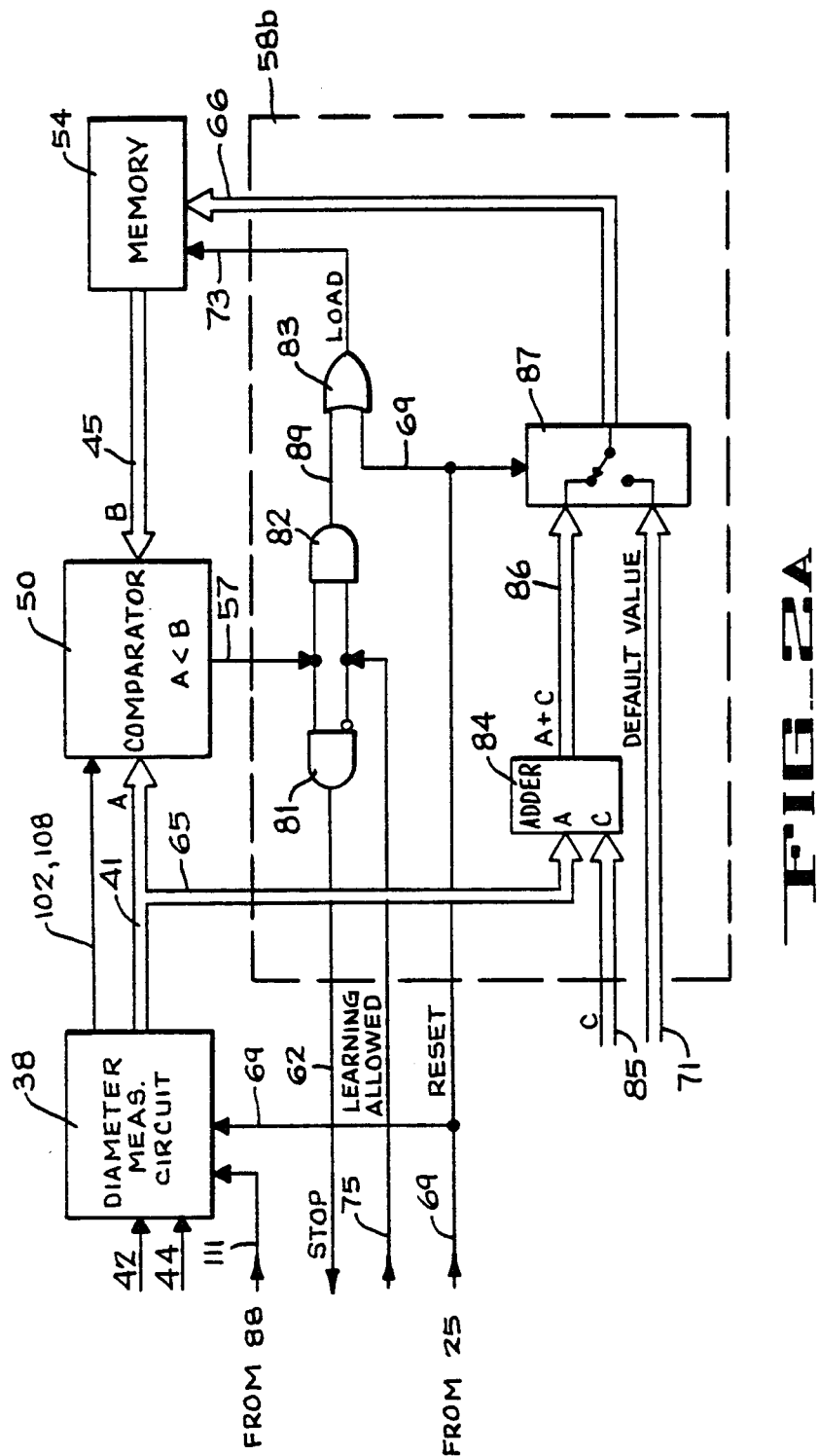

In FIG. 2A a portion of the control logic and memory circuit 58 of FIG. 1, indicated 58b, is shown in more detail and it will be described below.

When the end of tape detection circuit operates in a mode where learning is not allowed, for example in a shuttle mode, a control signal received on line 75 is low. That signal is provided by a common portion 58b, 60b of the control logic and memory circuits 58, 60, which portion is shown in FIG. 2B and will be described later. When at the same time the measured current diameter value A on line 41 is smaller than the minimum diameter value B currently stored in memory 54 and applied via line 45 to comparator 50, a high control signal on line 57 is applied to connected first inputs of AND gates 81, 82. The signal on line 75 is applied to connected second inputs of AND gates 81, 82, of which the second input of gate 81 is inverted. The respective input signals on lines 57, 75 effect a high output signal on line 62 from gate 81 which in turn is applied to stop the tape transport mechanism (not shown), thereby preventing tape run-off from the supply reel 22, as previously described. At the same time the output signal from gate 82 on line 89 is low. Thus in absence of a reset signal on line 69 the output signal on line 73 from OR gate 83 is low and the memory 54 is prevented from loading a new value.

In other operating modes, for example during record, playback or variable speed playback, learning is allowed and the control signal on line 75 is high. If a high control signal on line 57 is obtained indicating that the currently measured diameter A on reel 22 is smaller than the value B previously stored in memory 54, the output signal from AND gate 81 on line 62 is low and the tape transport will not be stopped. The respective high signals on lines 57, 75 effect application of a high output signal on line 89 from AND gate 82 to one input of OR gate 83. This is turn effects a load signal on line 73 to go high which signal enables updating the memory 54 with a new value.

The memory 54 will be now updated by replacing the previously stored value B by the currently measured value A as follows. An adder 84 is preferably utilized to add a predetermined constant value C obtained on line 85 to the currently measured value A on line 65. The value C is selected to compensate for an inertia of the tape transport mechanism which causes the tape movement to continue after the stop signal on line 62 has been applied thereto. Thus the value C is determined considering a particular inertia provided by a particular tape transport, a particular tape speed and reel size utilized. The thusly compensating tape diameter value A+C is applied via line 86 to one input of a switch 87. The other input of switch 87 is coupled to receive the previously mentioned default value on line 71. The output of switch 87 is coupled via a data line 66 to a data input of memory 54. Because the respective signals on lines 71 and 85 represent constant values they may be for example preset or hard wired binary values as it is well known in the art.

The switch 87 is controlled by the previously described reset line 69 to apply one of its inputs to its output 66. When the control signal on the reset line 69 is low, the switch is controlled to apply the value A+C via line 66 to memory 54 where it replaces the previously stored value B. At a high reset signal on line 69 indicating, for example, that the tape is outside its predetermined path, the switch 87 is controlled to apply the default value on line 71 via line 66 to the memory 54 where it replaces the previously stored minimum tape pack diameter value B. The signal on line 69 is obtained for example from the previously described tape detector 25 shown in FIG. 1. The latter signal serves to prevent a stored minimum diameter value which has been detected for a particular reel from being utilized for a different reel which may have a significantly different reel hub diameter, as previously described. It also prevents the use of invalid diameter numbers from entering the memory.

It will be understood from the foregoing description that in applications where it is not necessary to compensate for the inertia, the line 85 and adder 84 in FIG. 2 will be deleted from the circuit diagram. It is noted that when the adder 84 is utilized, memory 54 in FIG. 2A should only be allowed to "learn" when the diameter of reel 22 is decreasing to avoid continuously increasing the stored diameter number.

FIG. 3 shows an example of a detailed functional block diagram of the diameter measuring circuit 38 of FIGS. 1 and 2A and will be described now. The previously described elements 31, 33 and 25 shown in FIG. 1 as being located along the tape path are deleted from FIG. 3 for simplicity.

As it has been previously described with reference to FIG. 1, the supply reel 22 tach pulses from detector 32 are applied via line 42 to one input of the diameter measuring circuit 38. The tape timer idler 30 tach pulses detected by detector 36 are applied via line 44 to a second input of the circuit 38.

In the preferred embodiment during one revolution of the supply reel 22 sixteen tach pulses are generated by the tach detector circuit 32 and transmitted on line 42 to a clock input of a first counter 91 of FIG. 3. The counter 91 is utilized as a divide by 16, that is, it provides a "once around" low output pulse on line 93 for each 16 clock pulses received on line 42. Thus counter 91 divides by a number n corresponding to the number of supply reel tach pulses per revolution. The output pulses on line 93 are applied to an input of a second counter 95 whose clock pulses are provided by the tape timer tach pulses on line 44. Thus the second counter 95 counts the number of tape timer tach pulses on line 44 occurring between two consecutive once around output pulses on line 93. The resulting count A on line 97 in the form of a binary number is applied during each once around pulse on line 93 to a current diameter memory 98 and is stored therein as it will be described below.

To facilitate the description, the circuit of FIG. 3 will be first described without considering the encircled circuit portion 101. For the simplified description a control line 102 will be considered, shown by an interrupted line.

In accordance with that simplified description, a reel diameter value A which has been previously stored in memory 98 is updated by a currently measured value A as follows.

During each once around low pulse on line 93 the counter 95 stops counting. The duration of that pulse is preferably one sixteenth of a supply reel revolution. The pulse on line 93 is applied via line 94 to an inverting input of an AND-gate 100. The other input of AND-gate 100 is kept high unless there is a change in the tape direction as indicated by the control signal on line 111a, as it will be described later. A resulting high output signal on line 102 from AND-gate 100 is applied as a load control signal to the current diameter memory 98. In response to the signal on line 102 the memory 98 updates its contents with the currently measured diameter value A applied thereto on line 96.

It follows from the foregoing description that the memory 98 is updated once per revolution of the supply reel 22, unless the control signal on line 111a indicates change of direction. The control signal 111a is obtained from a tape direction output signal applied by a tach processor 88 connected to the tape timer idler tach circuit 36 shown in FIG. 1.

When a change in the direction of longitudinal tape movement occurs, that is from forward to reverse movement or vice versa, both the supply and takeup reel 22, 24 will first come to a stop and thereafter they will start to rotate in opposite direction. During that transition period the tape idler 30 shown in FIG. 1 may continue to rotate even when the reels 22, 24 are at a temporary standstill. Consequently the counter 95 would provide erroneous tape diameter measurements. To prevent the foregoing errors, the previously mentioned tape direction change control signal on line 111a resets both a D-flip-flop 106 and the first counter 91 via an OR-gate 104. The flip-flop 106 has its D-input permanently connected to a logic high signal and its clock input connected via line 92 to the output of the first counter 91. Thus the Q-output of flip-flop 106 is high whenever a rising edge of a previously described low pulse from counter 91 occurs on line 93. However, when a reset pulse on line 111a is received, the flip-flop 106 provides a low going pulse at its Q-output and the load signal on line 102 is disabled, thereby preventing a currently measured diameter value A from updating the memory 98.

The circuit portion 101 serves to further improve the operation of the circuit of FIG. 3. Prior to updating a previously stored value in the memory 98 with a new value A, the circuit portion 101 compares the last obtained measured value A1 with the new value A. Only when it is determined that the new value A does not significantly differ from the last measured value A1, then it is loaded in memory 98. Because these values A, A1 are being compared after each revolution of the reel, any significant change in these subsequent diameter values from one revolution to the next would indicate an error in the current diameter measurement and therefore the memory 98 should not be updated in that case.

In the embodiment of FIG. 3 the circuit portion 101 utilizes a last measured value memory 110 and a comparator 113. It is noted that when the circuit portion 101 is utilized, the interrupted line 102 is deleted from the circuit diagram. Thus the current measured diameter value A is applied from the second counter 95 via line 97 to the last measured value memory 110. The previously described memory load control line 102 is now connected to memory 110 instead to the memory 98. In operation, at every once around output pulse on line 93 from counter 91 and when no change in the direction signal is received on line 111a, the value A from counter 95 is loaded into the memory 110 and held until the arrival of the next pulse on line 93. The comparator 113 receives the currently measured value A via line 96 and the stored value A1 from the last value memory 110 via line 103 and compares these values. When the two values are only slightly different while the difference basically corresponds to one revolution of the reel, then the comparator 113 provides a load signal on line 108. That load signal in turn enables loading the output signal A on line 96 into memory 98, thereby updating the current diameter measurement therein. The content of the current diameter memory 98 is applied via line 41 to a comparator 50 as it has been previously described with respect to FIG. 2A. To assure proper operation of the circuit of FIG. 2A, the previously described transfer of value A on line 41 from circuit 38 to the comparator 50 is also controlled by the load control signal on line 102 or 108, respectively.

FIG. 2B shows a further control circuit portion 58a, 60a which is common to both control and memory circuits 58, 60 of FIG. 1. The circuit of FIG. 2B controls the previously described learning operation modes of each respective reel 22, 24 and it will be described below.

The circuit of FIG. 2B receives the previously mentioned direction control signal on line 111 from the tach processor 88 shown in FIG. 1, indicating whether the tape 20 moves in forward or reverse direction. The signal on line 111 is applied to one input of a first NAND gate 216 and to an inverting input of a second NAND gate 217. The other inputs of NAND gates 216, 217 receive the previously described control signal on line 61 shown in FIG. 1, indicating that continuous learning is allowed. In the preferred embodiment the signal on line 61 is applied from a capstan servo circuit, which circuit is well known in the art and it is shown for example at 116 in FIG. 4.

The respective output signals from each NAND gate 216, 217 are applied on lines 218, 219 each to a respective input of a D-flip-flop 220, 221. The D-flip-flops receive the previously described control signal on line 102 or 108 of FIG. 3 as a clock signal and they also receive a reset signal on line 69, corresponding to the previously described control signal from the tape detector 25 of FIG. 1.

The output signal on line 75 from D-flip-flop 220 corresponds to the control signal received on line 75 of FIG. 2A indicating to the supply reel 22 circuit portion that learning is allowed. Analogously, the output signal on line 76 from D-flip-flop 221 indicates that learning is allowed and that control signal is applied to the takeup reel 24 circuit portion, which is analogous to the circuit of FIG. 2A.

In operation, a reset signal on line 69 resets both D-flip-flops 220, 221, causing the output signals on lines 75, 76 to go high and thereby allowing learning on both reels 22, 24. If thereafter continuous learning is not allowed, the signal on line 61 is low and both outputs on lines 218, 219 from NAND gates 216, 217, and thus both D-inputs of the flip-flops will be high. However, in case continuous learning is allowed, the signal on line 61 is high and one D-input of the flip-flops 220, 221 will be high while the other one is low, depending on the high or low status of the tape direction line 111. The foregoing prevents continuous learning on both reels simultaneously. This additional feature eliminates unnecessary continued comparison between a stored diameter value and continuously increasing measured diameter values, for example, of the supply reel when the tape is moving in reverse direction or of the takeup reel when the tape is moving in forward direction.

The above-described control signal on line 218 which is present on the D-input of flip-flop 220 is transferred to the inverting Q-output thereof at the occurrence of the previously described control signal on line 102 or 108 of FIG. 3. Analogously, the signal on line 219 is transferred to the inverting Q-output of flip-flop 221 at a clock signal received on line 102a or 108a, shown in FIG. 1, from the takeup reel diameter measuring circuit 40. Consequently, every time a valid measured diameter value A is stored in the current diameter memory 98 of FIG. 3, the respective control signals on lines 75, 76 will indicate whether learning for each particular reel is allowed. In the preferred embodiment, the flip-flops 220, 221 operate at the negative edge of the clock signal to allow loading the value A on line 96 to memory 98 of FIG. 3 prior to applying the control signals on lines 75, 76, respectively. The above-indicated provision also assures proper loading of value A from the diameter measuring circuit 38 to the comparator 50 simultaneously with loading the memory 98.

Figure 4:
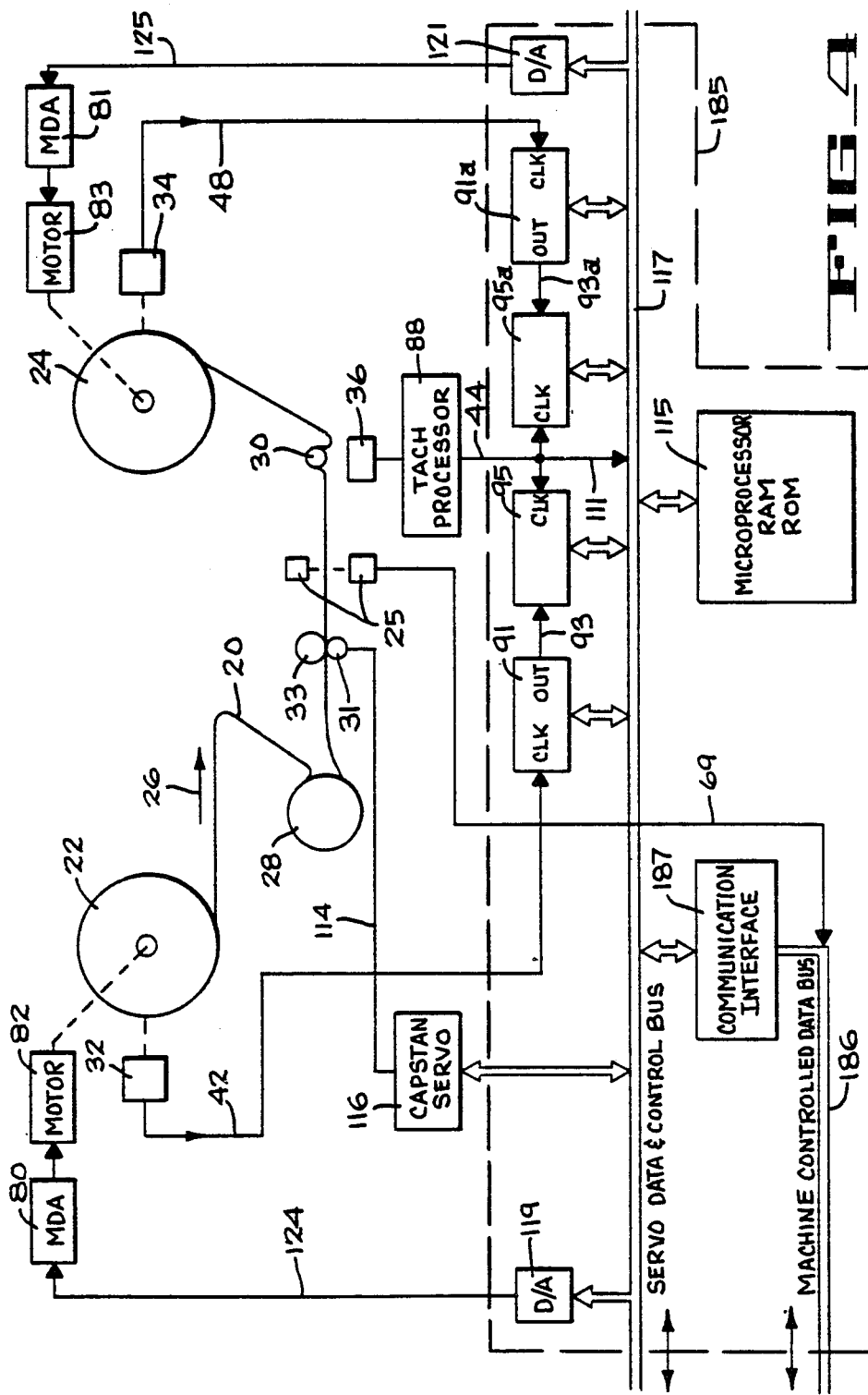
FIG. 4 is a block diagram showing a preferred implementation of the circuit of FIGS. 1 to 3.

While the foregoing description of the adaptive end of tape detection circuit of the invention has been made with reference to the functional block diagrams of FIGS. 1 to 3, the circuit is preferably implemented as shown in FIGS. 4 to 5D and as it is described below. With respect to the similarity between the circuits of FIGS. 1 and 4 only the differences will be described to avoid repetition.

In FIGS. 4 to 5D the previously described memories 54, 56, control logic and memory circuits 58, 60 and the comparators 50, 52 of FIG. 1 are implemented by a microprocessor and memory circuit 115. The circuit 115 comprises a microprocessor, a random access memory (RAM) and a read only memory (ROM). These and other circuit elements of FIG. 4 are shown in detail in the schematic electrical circuit diagram of FIGS. 5A to 5D. A servo data and control bus 117 connects the circuit 115 with the respective counters 91, 95, 91a, 95a and with the rest of the device. As it is well known from digitally controlled magnetic recording/reproducing devices, the bus 117 also connects the respective reel servo, capstan servo and other servo circuits (not shown) of the device with the microprocessor, RAM and ROM of circuit 115, respectively. The capstan 31 is shown as being connected via line 114 to a well known capstan servo circuit 116 which circuit in turn is connected also to the bus 117. When the capstan servo 116 is disabled, it applies a control signal to the microprocessor of circuit 115 via bus 117. The microprocessor in turn provides a previously described low control signal on line 61 indicating that learning is not allowed. Analogously, it applies a high signal on line 61 when the servo 116 is operating.

Well known digital-to-analog converters 119, 121 are utilized, one for each reel 22, 24 to convert various digital control signals received on the bus 117 into analog signals on line 124, 125 suitable for controlling analog motor drive amplifiers (MDA) 80, 81. The MDA's 80, 81 in turn control the respective supply and take-up reel motors 82, 83 in a well known manner.

The previously described output signal on line 44 from the tape timer idler tachometer circuit 36 is applied to a tach processor 88 which has an output connected to the bus 117 via a control line 111. The tach processor circuit receives from the tach detector 36 via line 44 two tach signals which are 90 degrees phase shifted with respect to each-other, in either direction, depending on the direction of tape 20 movement and thus on the direction of rotation of the idler 30. In response thereto the tach processor 88 generates a direction signal on line 111 corresponding to the actual direction of tape movement. Thus when a change of tape direction is indicated by the signal on line 111, the microprocessor in circuit 115 will reset the contents of the counters 91, 95, 91a and 95a as previously described with respect to FIG. 3, to avoid measuring errors.

In addition to the above-described servo data and control bus 117 shown in FIG. 4 a machine controlled data bus 186 is utilized in the device. The bus 186 is primarily utilized to convey various data and control signals between the machine control (not shown), servos, microprocessor and memory circuit 115 and other portions of the device. To enable transfer of data between the respective data busses 117, 186 a communication interface 187 is utilized in a well known manner, as it is also shown in the detailed circuit diagram in FIGS. 5B and 5C.

For example, the machine controlled data bus 186 conveys the previously described control signal on line 69 obtained from sensor 25, informing the machine control that the tape is out of path. The latter control signal is also transmitted via the communication interface 187 and bus 117 to the microprocessor and memory circuit 115. Other control signals which are transferred via the machine controlled data bus 186 include mode command signals indicating whether the device is in record, playback, shuttle or cue operation, and signals applied from the microprocessor circuit 115, such as the previously described stop signals on lines 62, 64 of FIG. 1.

FIGS. 5A to 5D are consecutive portions of a detailed schematic circuit diagram corresponding to a portion 185 of FIG. 4 as it is indicated by an interrupted line to facilitate comparison and which detailed diagram is described below.

To avoid repetition only those portions of the detailed diagram of FIGS. 5A to 5D will be described which are different from FIG. 4 or are not shown therein.

To provide a more complete disclosure, as an example, in FIGS. 5A to 5D the respective integrated circuit elements are designated by type numbers under which these elements are commercially available.

Thus in FIG. 5A the respective counters 91, 95 and 91a, 95a are implemented by two integrated counter circuits, preferably type 8253-5. Each integrated circuit comprises three counters and an interface 191, 191a connected to the servo data and control bus 117.

With further reference to FIG. 5A the respective tach signals on lines 42, 48 from the supply and take-up tach detection circuits 32, 34 shown in FIG. 4 are each applied to one first counter 91, 91a via a squaring amplifier 171, 172, respectively. These amplifiers receive the analog tach signal on lines 42, 48 and provide a square wave output signal suitable for applying to the counters 91, 95, 91a, 95a as a clock signal.

FIG. 5A also shows the previously described digital-to-analog converters 119, 121, preferably implemented as type 6080. An output port 194, preferably type 74LS273, is utilized for connecting respective control lines 195 of the counters 91, 95, 91a and 95a to the bus 117.

In FIGS. 5B to 5D the microprocessor and memory circuit 115 of FIG. 4 is shown as utilizing a microprocessor circuit 196, a RAM circuit 197 and two ROM circuits 198a and 198b, respectively. The microprocessor is preferably type MC6802, the RAM type TC5517APL and the ROM's type 27128, respectively. The RAM 197 is utilized to store, among other values, the continually changing respective reel diameter values, as it has been described previously with respect to the memories 54, 56 of FIG. 1, and memories 98 and 110 of FIG. 3, respectively.

The ROM's 198a and 198b are utilized to store, besides other values, programs controlling the operation of the microprocessor 196 in accordance with the flow charts of FIGS. 6 to 8 which will be described later. These ROM's also store the previously mentioned default diameter value and the constant value C utilized to compensate for the inertia of the tape transport mechanism.

A system reference clock, which in the preferred embodiment has a frequency of 4 MHz is applied on line 215 to the microprocessor 196 from a well known reference clock generator (not shown).

An interface device 188, preferably type LS245 is utilized to connect the respective circuits 196, 197, 198a and 198b to the bus 117 as well known in the art.

The communication interface 187 of FIG. 4 is implemented in FIGS. 5B and 5C by four input/output ports, preferably type LS374, connected between the servo data and control bus 117 and the machine controlled data bus 186, as previously described.

Address decoders 190, shown in FIGS. 5B to 5D, are preferably implemented by four integrated circuits type LS138 and are utilized to address various input/output ports 187 by the microprocessor 196. An address buffer 199, shown in FIG. 5D, preferably type LS541, is connected between the circuits 115, and 190 to buffer the address lines going from the circuit 115 addressing the decoders 190.

Control lines 201, 202 and 203 in FIG. 5B are read/write lines connected to the microprocessor 196. On lines 204, 205 of FIG. 5B an internal clock signal of 1 MHz is provided by the microprocessor 196, obtained by dividing the previously mentioned 4 MHz system clock by four. Lines 206, 207 represent buffered address lines which are utilized together with device select lines 210, 211 shown in FIG. 5C from address decoders 190 to address the individual counters 91, 95, and 91a, 95a, respectively.

The operation of the circuit of FIGS. 4 to 5D will now be described with reference to the various flow chart diagrams of FIGS. 6 to 8. These respective flow charts show various operation steps performed by the circuit of FIGS. 4 to 5D. These operations are controlled by the microprocessor 196 and they are performed in accordance with programs stored in ROM's 198a and 198b. The operation described and shown in these flow charts is analogous with the operation previously described with reference to the functional block diagrams of FIGS. 1 to 3.

In the description below the following flags will be utilized:

Flag 1 indicates a valid diameter measurement. It is set by block 132 of FIG. 6.

Flag 2 indicates that a diameter measurement has been seen before. It is set by block 134 of FIG. 6.

Flag 3 indicates that the next diameter measurement has to be skipped. It is set by block 150 of FIG. 7.

Flag 4 indicates that learning is allowed once and it is set by block 147 of FIG. 7. Flag 4 is then updated in block 170 of FIG. 8 depending on the status of an external signal indicating whether continuous learning is allowed.

Now with reference to the flow chart of FIG. 6, it shows steps corresponding to an operation which is analogous with the method of continuously measuring the tape pack diameter on one reel, as it has been described with reference to FIG. 3. Two identical subroutines are utilized, one for each reel 22, 24, and each corresponding to the flow chart of FIG. 6. Therefore, to avoid repetition, the following operation will be described with respect to the supply reel 22 only. In the preferred embodiment this operation is performed approximately 900 times per second to insure that every measurement taken is considered by the microprocessor 196. The timing of this operation is derived from the system reference clock and it is entered by an interrupt signal.

As indicated by block 124 of FIG. 6, the microprocessor 196 determines continuously whether a once around reel tach output pulse on line 93 from counter 91 has been obtained. If not obtained, the circuit repeatedly checks until the presence of that pulse is determined. Then block 126 determines whether the same pulse has been already detected before by testing whether a flag 2 has been previously set. The foregoing step assures that at slow rotational speed of the reel the same pulse on line 93 will not be repeatedly considered by the circuit.

If the pulse on line 93 has not been detected before, a validity check in box 128 is made by testing whether flag 3 has been set previously. If flag 3 is present, that measurement will be skipped. As indicated by block 136, flag 3 is then cleared to allow to consider the next measurement. Block 134 then sets the previously mentioned flag 2 to indicate that the presently considered measurement has been seen.

Returning now to block 128 of FIG. 6, in case flag 3 is not present, then the obtained diameter measurement will not be skipped, and it will be read as it is indicated by block 130.

To simplify the following description, the steps indicated by blocks 127, 131 enclosed by an interrupted line will be considered later. These steps correspond to the previously described operation of the circuit portion 101 of FIG. 3 and represent an additional feature of the circuit operation in accordance with the invention, as it has been described before.

As shown by block 129, the current diameter value is saved by updating a previous diameter value in RAM 197 and thereafter a flag 1 is set indicating that the measured diameter is valid, as shown of block 132.

Thereafter flag 2 is set by block 134 to indicate that the currently considered measurement has been seen as previously mentioned. The foregoing operation corresponds to updating the memory 98 of FIG. 3 without considering the circuit portion 101.

Returning now to the previously skipped block 127, prior to saving the current diameter value in RAM 197, the newly measured value is compared to the last measured value. The latter step corresponds to the operation of the circuit 101 of FIG. 3. If the compared values are sufficiently close, the previously described step 129 takes place. If the compared values are not close, the operation continues as indicated by block 131, which step is analogous with replacing a last measured value with a current value in memory 110 of FIG. 3, every time a new measurement has been taken by counter 95.

Block 125 of FIG. 6 clears flag 2 if the once around reel tach pulse is not detected.

FIG. 7 is a flow chart related to a control operation of the previously described diameter measuring process shown in FIG. 6, and it corresponds in part to the operation of the circuit portion of FIG. 2B. Block 142 determines whether the tape is out of path. If yes, block 144 disables the diameter measuring hardware, that is, the counters 91, 95 and 91a, 95a, and clears flag 1. An analogous operation has been described before with reference to FIG. 3 when a reset signal on line 69 has been received.

Because of the reel servos being turned off when the tape is out of path, as it is well known for example in the art of helical video tape recorders, block 146 continuously checks whether the reel servos have been reactivated. When they are reactivated after the tape has been reinserted in the prescribed tape path, block 147 sets a flag 4 indicating that one learning cycle is allowed to take place and the diameter measuring hardware is enabled by block 148. This corresponds to the operation of the circuit of FIG. 2B after a reset signal on line 69 is received.

The previously mentioned flag 3 is set by block 150 to skip the first measured value from being considered, for example after the tape has been reinserted into its path. Flag 3 assures that the first measurement after the tape being out of path will be discarded because of the high probability of error while the tape may not yet be properly tensioned, as it has been previously described with respect to the operation of D-flip-flop 106 of FIG. 3.

When it is determined by block 142 that the tape is not out of path, and by block 152 that no change in tape direction has occurred, no further action is necessary.

However, when block 152 detects a change in the tape direction the diameter measuring hardware is being reset by block 154. The latter operation is analogous to that of FIG. 3 upon receiving a control signal on line 111 which causes resetting the counter 91 and D-flip-flop 106.

FIG. 8 shows operation related to updating a currently stored diameter value in the memory, RAM 197, which operation is analogous with updating the previously described memory 54 of FIGS. 1 and 3 or memory 56 of FIG. 1, respectively.

Block 162 first determines whether learning is allowed by examining whether the previously described flag 4 has been posted by block 147 of FIG. 7, indicating that learning is allowed. If learning is allowed, block 164 further examines whether the current diameter measurement provided by the counters 91, 95 is valid by examining the previously described flag 1 provided by block 132 of FIG. 6. If flag 4 or 1 is absent the program waits for the next valid measurement, that is until both flags are set. For example, the first measurement after the tape has been out of path is always skipped as it has been described before. When a valid diameter is indicated, its value is compared in block 166 with the presently stored minimum diameter value in the RAM 197. If the new value is smaller than the stored value, a constant value C is added to the new diameter value in block 168, to compensate for the tape transport inertia as it has been previously described with reference to FIG. 2. The memory 197 is then updated with the thusly obtained value as it is indicated by block 169, that is, the previously stored minimum diameter value is replaced by the value obtained by block 168.

Thereafter as indicated by block 170, flag 4 which has been previously set by block 147 of FIG. 7 is updated, depending on an external control signal value indicating whether continuous learning is allowed. The latter operation is analogous with the previously described operation of the circuit of FIG. 2B. Consequently, in block 170 flag 4 remains set if continuous learning is allowed and is cleared if continuous learning is not allowed, respectively. Various modifications of the disclosed embodiments, as well as alternative embodiments may become apparent to those skilled in the art without departing from the spirit and scope of the invention defined by the appended claims.

What is claimed is:

1. An apparatus for detecting end of tape on a reel in a tape recording or reproducing device having a transport means for moving the tape between a supply reel and a takeup reel, comprising:
   means for measuring a diameter of a tape pack on a reel; and
   means for comparing said measured diameter to a stored diameter value corresponding to an end of tape on said reel, and for updating said stored diameter value by said measured value when said measured value is smaller than said stored value and when said apparatus is in a learning mode, and for applying a control signal to said transport means when said measured value is substantially equal to said stored value and when said apparatus is in other than said learning mode.

2. The apparatus of claim 1 wherein said tape recording or reproducing device comprises a capstan in contact with the magnetic tape and wherein said learning mode is provided when a movement of said tape is controlled by said capstan.

3. The apparatus of claim 1 further comprising means for detecting a change in direction of tape movement and for disabling said diameter measuring means during a predetermined number of revolutions of said reel in response to said change in direction.

4. The apparatus of claim 2 further comprising a first memory means and wherein said diameter value corresponding to said end of tape is stored in said first memory means.

5. The apparatus of claim 4 further comprising means for detecting absence of said tape from a prescribed tape path within said recording/reproducing device and for disabling said diameter measuring means and resetting said first memory means to store a predetermined diameter value in response to an output signal from said detecting means.

6. The apparatus of claim 4 wherein said means for updating said stored diameter value in said first memory means further comprises means for adding a predetermined constant value to said measured diameter value to compensate for an inertia of said transport means.

7. The apparatus of claim 6 further comprising means for preventing said first memory means from updating said stored diameter value therein when said measured diameter value is increasing.

8. The apparatus of claim 4 further comprising a second memory means having an input coupled to receive and store an output signal from said tape pack diameter measuring means; and
a second means for comparing a last measured value stored in said second memory means and a diameter value stored in said first memory means and to apply a load control signal to said first memory means when a difference between said respective values is within a predetermined range.

9. The apparatus of claim 1 wherein one said tape pack diameter measuring means is provided for each said supply and takeup reel, respectively, and each said measuring means comprises a first counter means coupled to receive first tach pulses indicating revolutions of one said reel and providing a once around output pulse, a second counter means having a first input coupled to receive said once around output pulse from said first counter means and a second input coupled to receive second tach pulses indicating revolutions of a tape timer idler in contact with said tape,
said second counter providing an output signal corresponding to a number of second input pulses occurring between two first input pulses, said output signal being indicative of said tape pack diameter on said reel.

10. The apparatus of claim 4 further comprising means for preventing said first memory means from updating said stored diameter value therein when said circuit is in said other than learning mode.

11. An apparatus for detecting end of tape on a reel in a magnetic tape recording or reproducing device wherein said tape is transported between a supply and takeup reel, comprising:
means for measuring a diameter of a tape pack on each said reel,
means for storing a tape pack diameter value on each said reel corresponding to an end of tape on said reel; and
means for updating said stored diameter value when a measured diameter value is smaller than said stored value and when said apparatus is in a learning mode and for stopping said tape when said measured value is substantially equal to said stored value and when said apparatus is in an other than learning mode.

12. An apparatus for detecting end of tape on a reel in a magnetic tape recording or reproducing device wherein said tape is transported between a supply and takeup reel, comprising:
means for measuring a diameter of a tape pack on each said reel;
means for storing a tape pack diameter value on each said reel corresponding to an end of tape on said reel;
means for updating said stored diameter value when a measured diameter value is smaller than said stored value and when said apparatus is in a learning mode and for stopping said tape when said measured value is substantially equal to said stored value and when said apparatus is in an other than learning mode; and wherein
said means for updating said stored diameter value further comprises means for adding a predetermined constant value to said measured diameter value to compensate for an inertia of said transport means; and
means for preventing said first memory means from updating said stored diameter value when said measured diameter value is increasing.

13. An apparatus for detecting end of tape on a reel in a magnetic tape recording or reproducing device wherein said tape is being transported between a supply and takeup reel, comprising:
means for measuring a diameter of a tape pack on each said reel;
first memory means for storing a tape pack diameter value on each said reel corresponding to an end of tape on said reel;
means for updating said stored diameter value when a measured diameter value is smaller than said stored value and when said apparatus is in a learning mode and for stopping said tape when said measured value is substantially equal to said stored value and when said apparatus is in an other than learning mode;
second memory means having an input coupled to receive and store an output signal from said tape pack diameter measuring means; and
second comparator means coupled to compare a last measured value stored in said second memory means and a diameter value stored in said first memory means and to apply a load control signal to said first memory means when a difference between said respective values is within a predetermined range.

14. An apparatus for detecting end of tape on a reel in a magnetic tape recording or reproducing device having a transport means for moving the tape between a supply reel and a takeup reel, comprising:
means for measuring a diameter of a tape pack on a reel;
means for comparing said measured diameter to a stored diameter value corresponding to an end of tape on said reel, for updating said stored diameter value by said measured value when said measured value is smaller than said stored value and when said apparatus is in a learning mode and for applying a stop signal to said reel transport when said measured value is substantially equal to said stored value and when said apparatus is in other than said learning mode; and
means for detecting a change in direction of tape movement and for disabling said diameter measuring means during a predetermined number of revolutions of said reel in response to said change in direction.

15. An apparatus for detecting end of tape on a reel in a magnetic tape recording or reproducing device having a transport means for moving the tape between a supply reel and a takeup reel, comprising:
means for measuring a diameter of a tape pack on a reel; and
means for comparing said measured diameter to a stored diameter value corresponding to an end of tape on said reel, for updating said stored diameter value by said measured value when said measured value is smaller than said stored value and when said apparatus is in a learning mode and for applying a stop signal to said reel transport when said measured value is substantially equal to said stored value and when said apparatus is in other than said learning mode; and means for detecting absence of said tape from a prescribed tape path within said recording or reproducing device and for disabling said diameter measuring means and resetting said diameter memory means to store a predetermined diameter value in response to an output signal from said detecting means.

16. An apparatus for detecting end of tape on a reel in a magnetic tape recording or reproducing device wherein said tape is being transported between a supply and takeup reel, comprising:

means for measuring a diameter of a tape pack on each said reel;

means for storing a tape pack diameter value corresponding to an end of tape on each said reel;

means for updating said stored diameter value for a particular reel when a measured diameter value of that reel is smaller than said stored value and when said apparatus is in a learning mode and for stopping said tape when said measured value is substantially equal to said stored value and when said apparatus is in an other than learning mode; and wherein each said measuring means comprises a first counter means coupled to receive first tach pulses indicating revolutions of one said reel and providing a once around output pulse, a second counter means having a first input coupled to receive said once around output pulses from said first counter means and a second input coupled to receive second tach pulses indicating revolutions of a tape timer idler in contact with said tape, said second counter providing an output signal corresponding to a number of second input pulses occurring between two first input pulses, said output signal being indicative of said tape pack diameter on said reel.

17. An apparatus for detecting end of tape on a reel in a magnetic tape recording or reproducing device having a transport means for moving the tape between a supply reel and a takeup reel, comprising:

means for measuring a diameter of a tape pack on said reel; and means for comparing said measured diameter to a stored diameter value corresponding to an end of tape on said reel, for updating said stored diameter value by said measured value when said measured value is smaller than said stored value and when said apparatus is operating in a recording or playback operation mode, and for applying a control signal to said transport means when said measured value is substantially equal to said stored value and when said apparatus is operating in one of shuttle and cue operation modes.

18. The apparatus of claim 17 wherein said apparatus comprises a capstan in contact with said magnetic tape, said apparatus further comprising means for providing a control signal when said longitudinal tape movement is controlled by said capstan and means for activating said learning mode in response to said control signal.

19. A method of detecting end of tape on a reel in a tape recording or reproducing device where the tape is transported between a supply reel and a takeup reel by a transport means, comprising the steps of:

measuring a diameter of a tape pack on a reel to obtain a measured diameter value;

comparing said measured diameter value to a stored diameter value corresponding to an end of tape on said reel;

updating said stored diameter value by said measured value when said measured value is smaller than said stored value and when operating in a learning mode; and providing a control signal to said transport means when said measured value is substantially equal to said stored value and when operating in other than said learning mode.

20. The method of claim 19 wherein said tape recording or reproducing device comprises a capstan and wherein said learning mode is provided when said tape transport is controlled by said capstan.

21. The method of claim 19 further comprising a step of detecting a change in direction of tape movement and of discontinuing said measuring step during a predetermined number of reel revolutions after each direction change.

22. The method of claim 19 further comprising steps of detecting a presence of said tape in a prescribed tape path within said device, and discontinuing said measuring step and resetting said stored diameter value to a predetermined diameter value when said tape is absent from said prescribed tape path.

23. The method of claim 19 further comprising a step of adding a predetermined constant value to said measured diameter value to compensate for an inertia in said tape transport, prior to the step of updating said stored diameter value by said current measured value.

24. The method of claim 23 further comprising a step of preventing said updating step when said measured diameter of said tape pack is increasing.

25. The method of claim 19 further comprising a step of preventing said updating when operating in other than said learning mode.

26. The method of claim 19 wherein said diameter of a tape pack on each said reel is measured by providing an output signal corresponding to a selected number of revolutions of said reel and by counting a number of revolutions of a tape timer idler in contact with said tape between two said output signals.

27. The method of claim 19 further comprising the steps of:

storing a last measured diameter value obtained prior to a current measured value;

comparing said last obtained value and said current measured value; and providing a control signal preventing said updating step when a difference between said compared values is outside a predetermined range.

28. A method of detecting end of tape on a reel in a magnetic tape recording or reproducing device where the tape is transported between a supply reel and a takeup reel, comprising the steps of:

measuring a diameter of a tape pack on a reel to obtain a measured diameter value;

comparing said measured diameter value to a stored diameter value corresponding to an end of tape on said reel;

increasing said measured diameter value by a predetermined constant value to compensate for a tape transport inertia, when said measured value is smaller than said stored value and when operating in a learning mode while the diameter of said tape pack is decreasing;

updating said stored diameter value by said increased measured value; and providing a control signal for stopping said tape when said measured value is substantially equal to said stored value and when operating in other than said learning mode.

29. A method of detecting end of tape on a reel in a magnetic tape recording or reproducing device where the tape is transported between a supply reel and a takeup reel, comprising the steps of:

measuring a diameter of a tape pack on a reel to obtain a measured diameter value;

comparing said measured diameter value to a stored diameter value corresponding to an end of tape on said reel;

updating said stored diameter value by said measured value when said measured value is smaller than said stored value and when operating in a learning mode;

providing a control signal for stopping said tape when said measured value is substantially equal to said stored value and when operating in other than said learning mode;

storing a last measured diameter value obtained prior to a current measured value;

comparing said last obtained value and said current value; and providing a control signal preventing said updating step when a difference between said compared values is outside of a predetermined range.

30. A method of detecting end of tape on a reel in a magnetic tape recording or reproducing device where the tape is transported between a supply reel and a takeup reel, comprising the steps of:

measuring a diameter of a tape pack on a reel to obtain a measured diameter value;

comparing said measured diameter value to a stored diameter value corresponding to an end of tape on said reel;

updating said stored diameter value by said measured value when said measured value is smaller than said stored value and when operating in a learning mode;

providing a control signal for stopping said tape when said measured value is substantially equal to said stored value and when operating in other than said learning mode; and wherein said method further comprises the steps of detecting a change in direction of tape movement and discontinuing said measuring step during a predetermined number of reel revolutions after each direction change.

31. A method of detecting end of tape on a reel in a magnetic tape recording or reproducing device where the tape is transported between a supply reel and a takeup reel, comprising the steps of:

measuring a diameter of a tape pack on a reel to obtain a measured diameter value;

comparing said measured diameter value to a stored diameter value corresponding to an end of tape on said reel;

updating said stored diameter value by said measured value when said measured value is smaller than said stored value and when operating in a learning mode;

providing a control signal for stopping said tape when said measured value is substantially equal to said stored value and when operating in other than said learning mode; and wherein said method further comprises the steps of detecting a presence of said tape in a prescribed tape path within said device and discontinuing said measuring step and resetting said stored diameter value to a predetermined diameter value, when said tape is absent from said prescribed tape path.

32. A method of detecting end of tape on a reel in a magnetic tape recording or reproducing device where the tape is transported between a supply reel and a takeup reel by a transport means, comprising the steps of:

measuring a diameter of a tape pack on a reel to obtain a measured diameter value;

comparing said measured diameter value to a stored diameter value corresponding to an end of tape on said reel;

updating said stored diameter value by said measured value when said measured value is smaller than said stored value and when said apparatus is operating in a recording or playback operation mode; and applying a control signal to said transport means when said measured value is substantially equal to said stored value and when said apparatus is operating in one of shuttle or cue operation modes.

33. The method of claim 32, further comprising the steps of:

detecting a presence of said tape in a prescribed tape path within said device and resetting said stored diameter value to a predetermined value when said tape is absent from said prescribed tape path; and activating said updating step corresponding to one revolution of each said reel following each reset.

34. The method of claim 33 wherein said apparatus comprises a capstan in contact with the magnetic tape to control longitudinal tape movement, further comprising the steps of:

providing a control signal when said longitudinal tape movement is controlled by said capstan; and activating a continuous learning mode in response to said control signal provided by said capstan.

* * * * *